May 1, 1956     S. KAMIN     2,743,960
MULTIPLE CONDUIT HOSE
Filed Sept. 14, 1954
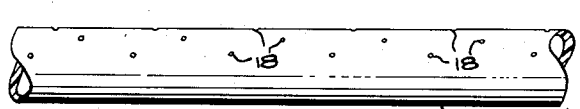 
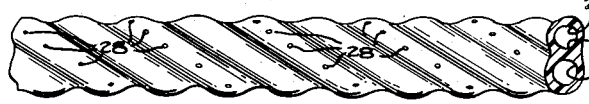 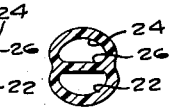
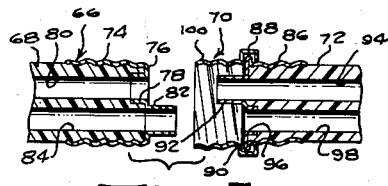  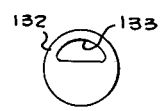
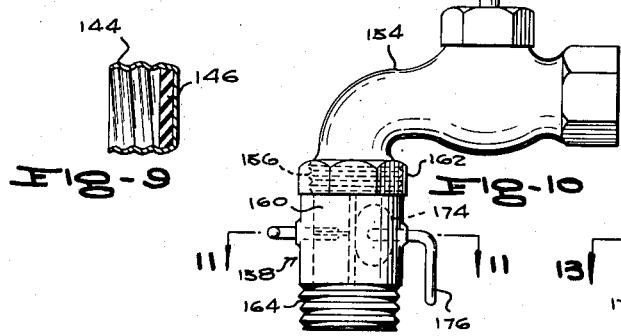
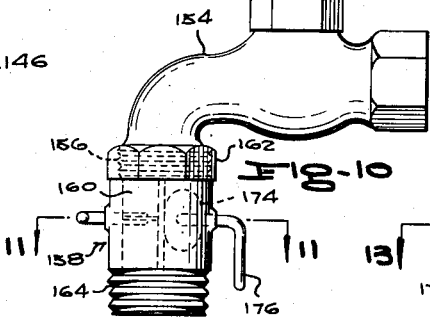 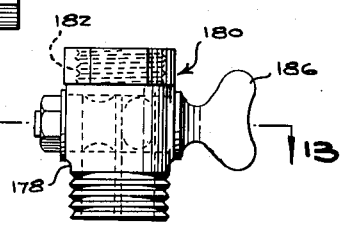
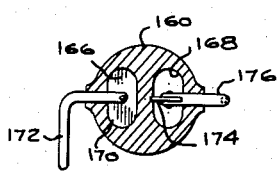 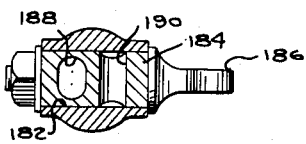
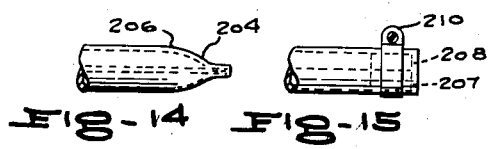
INVENTOR.
SAM KAMIN
BY McMorrow, Berman + Davidson
ATTORNEYS

United States Patent Office 2,743,960
Patented May 1, 1956

2,743,960

MULTIPLE CONDUIT HOSE

Sam Kamin, Houston, Tex.

Application September 14, 1954, Serial No. 456,018

2 Claims. (Cl. 299—104)

This invention relates to conduits and more particularly to hose having multiple conduits therein.

It is the principal object of this invention to provide a multiple conduit hose which will serve the dual purposes of an automatic water sprinkler and, at the option of the operator, perform the function of an ordinary garden hose.

There is presently available two types of watering hose, one that is used to direct a spray of liquid in a selected direction at the end thereof remote from the end connected to the source of the water supply, and usually through some type of nozzle. The other type of hose is that which is perforated throughout its length and placed on the ground in the desired location so that when the water passes therethrough, a fine mist spray will be effected from the perforations in the hose wall. Hence, it is the object of this invention to provide in a single hose, multiple conduits wherein one of the conduits will conduct the water to the end of the hose where it may be sprayed therefrom in a given direction and at least one other conduit which is perforated along its length to act as a garden hose sprinkler or soaker. Thus, the necessity for two separate types of hose will be eliminated and the operator may selectively use either the sprinkler or the spray conduit of the single multiple conduit hose constructed according to this invention.

Also, in the multiple conduit hose, there is provided readily attachable and detachable coupling means whereby successive lengths of the multiple conduit hose can be readily attached to each other to provide the desired over-all hose length. Also, in connection with the multiple conduit hose, a selective valve disposed between the source of water supply and the hose may be selectively operated to have the hose perform either the function of the automatic water sprinkler or the function of directing a stream of water at the free end thereof.

Other objects and advantages will become apparent from a consideration of the following detailed description forming the specification, taken in conjunction with the accompanying drawings, in which:

Figure 1 is a side elevational view of a portion of a length of multiple conduit hose, embodying this invention;

Figure 2 is a vertical, transverse, cross-sectional view of the hose of Figure 1;

Figure 3 is a multiple conduit hose of a modified construction;

Figure 4 is a vertical, transverse, cross-sectional view of the hose of Figure 3;

Figure 5 is a vertical, cross-sectional view through adjoining ends of successive hose sections and showing one form of a coupling whereby the hose lengths may be detachably secured together, this type of coupling being particularly adapted to the forms of the hose shown in Figures 1 and 3 and 5;

Figure 6 is a vertical, cross-sectional view of a cap to be used in connection with the coupling of Figure 5;

Figures 7 and 8 show forms of washers or gaskets to be used in connection with the hose couplings;

Figure 9 is a vertical, longitudinal cross-sectional view of an end cap for the multiple conduit hose of this invention;

Figure 10 is a side elevational view of a control valve as connected to a conventional outlet tap especially adapted for use with the forms of the multiple conduit hose as shown in Figures 1 and 3;

Figure 11 is a cross-sectional view taken on line 11—11 of Figure 10;

Figure 12 is a side elevational view of a modified form of feed valve;

Figure 13 is a cross-sectional view taken on line 13—13 of Figure 12;

Figure 14 is a side elevational view of the free end of a multiple conduit hose showing the construction in which the end of the hose may be enclosed; and Figure 15 is a side elevational view of the free end of the multiple conduit hose showing another manner in which the end of the hose may be sealed.

With continued reference to the drawings, there is shown in Figures 1 and 2, a section of the multiple conduit hose, generally indicated at 10, in which a pair of adjoining conduits 12 and 14 is provided in the hose 10 by a partition wall 16 extending transversely across the interior of the hose 10 and lying along its diametrical axis and extending longitudinally thereof for its entire length. The hose wall enclosing a portion of the conduit 14 is provided with a plurality of perforations or openings transversely therethrough in spaced relation to each other and preferably lying in longitudinally spaced rows with the apertures, indicated at 18, in each of the rows being offset with respect to each other.

Thus, it will be apparent that in the single hose 10 there is provided multiple conduits, in the number of two, one of which has a solid or imperforate wall, as indicated by the conduit 12, for the conduct of the stream of water therethrough. The stream of water passing through the solid wall in conduit 12 will emerge from the end of the hose 10 remote from its connection to the usual outlet tap in a spray which may be directed as desired by the operator. The other conduit 14 has the outer wall thereof perforated so that the water being conducted therethrough may emerge through the apertures 18, defining the perforations, so that a fine mist spray will result and the hose 10 may be laid along the ground in any desired pattern so as to have the ground watered at the desired locations.

In the modified form of the invention shown in Figures 3 and 4, the multiple conduit hose, generally indicated at 20, is of the rope twisted type having the conduits 22 and 24 twisted one about the other, with the hose being made of one-piece construction and the conduits separated from each other by a partition wall 26 extending medially across the hose 20 and extending longitudinally thereof. The outer wall of the conduit 22 is provided with a plurality of spaced apertures 28 longitudinally thereon so that the conduit defines a spray hose of the automatic type wherein the water carried through the conduit may be forced through the apertures, defining perforations, so as to provide a spray along the longitudinal extent of the hose 20. The solid walled conduit 22 will conduct a column of water therethrough which may emerge from the open free end of the hose, preferably through the usual hose nozzle.

In Figure 5, there is shown a male coupling member, generally indicated at 66, carried at one end of the length of hose 68 of the type shown in Figures 1 and 3, and a female coupling member, generally indicated at 70, carried by the adjacent end of a second length of hose 72, similar to the length if hose 68. The male coupling member 66 has its ferrule 74, which is externally threaded, crimped onto the free end of the hose length 68 with its annular end flange 76 overlying the terminal end face of the hose length. The end flange 76 carries an inwardly directed annular female member 78 in the form of a collar open at both ends and disposed within the conduit 80 of the hose 68. Also, there is provided a male member 82 in the form of a hollow tube extending outwardly from the end of the other conduit 84, the longitudinal bore through the male member or tube 82 being in register with the end of the conduit 84 so as to form a continuation thereof. The female coupling member 70 has a ferrule 86 crimped onto the free end of the hose length 72 and provided with an annular lip 88 extending thereabout at the terminal end of the hose with a depending annular flange 90 overlying the end face of the hose.

The flange 90 carries an outwardly extending male member 92 in the form of a hollow tube wherein the bore through the tube is in register with the conduit 94 in the hose 72. Also, the flange 90 carries a female member 96 in the form of an annular ring extending within the open end of another conduit 98 in the hose 72. In order to couple the length of hose 68 and 72 together, the male member 66 will be inserted into the female member 70 with the tubular, threaded wall connecting piece 100 rotatably carried by the ferrule 86 about the annular lip 88, being threaded on the ferrule 74 and the male members 82 and 92 received in the female members 96 and 78, respectively, so that the conduits 80 and 94 and the conduits 84 and 92 will be continuous. Thus, it will be apparent that successive lengths of conduit hose of the type shown in Figures 1 and 3 may be detachably coupled to provide any length of hose desired.

In Figure 6, there is shown an end cap 101 adapted to fit over either of the male members 82 or 92 to thereby block the conduit with which the respective male members are associated and thereby have the hose operative as either a soaker hose or a garden spray hose for only a portion of its length.

In Figures 7 and 8, there is shown washers 130, 132, particularly adapted for use with the coupling shown in Figure 9 and the forms of the multiple conduit hose shown in Figures 1 and 2. The washers are adapted to be placed within the coupling prior to the connection thereof so that the portion of the hose may be rendered inoperative by blocking off one of the conduits. Thus, it will be seen that the washer 130 will merely act as a sealing washer permitting operation of both of the conduits in the plural hoses 10 and 20 while the washer 132 having but the one opening 133 therethrough will not only act as a sealing washer but will block one of the conduits since the opening 133 is of such form as to register with the other one of the conduit openings of the hose.

In Figure 9, there is shown an end cap 144 which is adapted to be received upon the ferrule 74 or 102 to seal off the end of a hose, or may be crimped onto the end of the hose so that the solid rear plate 146 disposed at one end of the cap and retained therein by an annular flange depending from the adjacent end of the cap body, will close one end of the cap so that the flow of water from the free end of the hose will be stopped and only the soaker or spray hose conduits will be operative. It will be observed that the body of the end cap 144 is formed to have screw thread like diversions so as to be threadingly received at the free end of the hose to permit ready removal therefrom.

The conventional outlet tap 154 through which the water to be led into the multiple conduit hose will flow is provided with the usual handwheel operated type of valve and a spout provided with an externally threaded end flange. To this externally threaded end flange 156 there is connected a dual stemmed valve, generally indicated at 158, especially adapted for use with the multiple conduit hose of the form shown in Figures 1 and 3.

The valve 158 is shown in Figures 11 and 12, and comprises a cylindrical body 160 having an internally threaded annular flange 162 at one end thereof for connection to the externally threaded flange 156, and the body is externally threaded at its other end remote from the flange 162 and as indicated at 164 for connection to a female coupling carried by one end of the multiple conduit hose of the type shown in Figures 1 and 3.

The body 160 is provided with a pair of spaced, generally eliptical bores 166 and 168 longitudinally therethrough and adapted to register with their respective conduits in the multiple conduit hose to be connected to the valve. The butterfly valve 170 is disposed in the bore 166 intermediate the ends thereof and is operated by an externally extending handle 172 connected thereto so as to rotate the butterfly valve to selectively open and close the bore 166. A similar butterfly valve 174 has secured thereto an operating handle 176 and extending outwardly from the valve body 160 so that the butterfly valve 174 may be selectively rotated to open or close the bore 168. Hence, it will be seen that water flowing through the tap 154 may be selectively directed to one or the other, or both, of the conduits in the multiple conduit hose connected to the valve 158.

In Figures 12 and 13, there is shown a modified form of a valve of the single stem two-way throw type wherein the valve body 178 of the valve, generally indicated at 180, is a central bore 182 longitudinally therethrough in a barrel type valve 184 extending transversely thereacross intermediate its ends and rotatably mounted therein. The barrel valve 184 is provided with an externally extending, manually operative handle 186 whereby the valve 184 may be rotated about its axis so that the spaced bores 188 and 190 extending transversely therethrough in right angular relation to each other, may be brought into register with the bore 182 so as to permit water to flow therethrough and into one of the conduits of the multiple conduit hose to be connected thereto while blocking water from the other of the conduits of the hose. It will be apparent that by rotation of the handle 186 that either one or the other of the conduits may be brought into communication with the source of water supply emerging through a tap, similiar to the tap 154 to which the valve 180 is to be threadingly and detachably coupled.

To close the free end of any of the multiple conduit hoses disclosed herein, the end of the hose may be crimped together and if the hose is made of plastic material, the material heated so as to fuse to form a pointed sealed end 204 of a hose 206, as shown in Figure 14. Or, a pair of plugs 207 and 208 may be inserted at the free end of the multiple conduit hose, especially of the type shown in Figures 1 and 3, the plugs being inserted in the ends of the conduits and a clamp 210 tightened thereabout so as to seal the free end of the multiple conduit hose.

From the foregoing, it will be apparent that there has been provided a multiple conduit hose having a solid walled conduit and at least one perforated wall conduit. Also, there is provided a longitudinally extending partition wall, or walls, disposed across the hose bore to define along with the hose wall conduits through which a liquid may flow, the hose wall of one of the conduits having longitudinal rows of spaced apertures transversely therethrough to define perforations through which liquid flowing through said one conduit may escape as a spray, and means for detachably coupling the one end of the hose to the adjoining end of another similar hose, along with manually operable valve means interposed between the hose and the source of water supply whereby the water may be selectively introduced in at least one of the conduits, and also means at the free end of the hose remote from the source of water or liquid supply to seal the hose at this end for preventing the flow of liquid therefrom through the hose at this end.

While there is shown and described the preferred embodiment of the invention, it is to be understood that the structure is susceptible of change and modification within the practicability of the invention and therefore should be limited only by the scope of the claims appended hereto.

What is claimed is:

1. A multiple conduit hose comprising longitudinally extending partition wall disposed diametrically across the hose bore to define liquid conducting conduits, the hose wall of at least one of said conduits having longitudinal rows of spaced apertures transversely therethrough to define perforations through which liquid flowing through said one conduit may escape as a spray, means for detachably coupling one end of said hose to the adjoining end of another similar hose, and manually operable valve means operatively connected to and interposed between said hose and a source of liquid supply whereby the liquid may be selectively introduced into at least one of said conduits.

2. A multiple conduit hose comprising longitudinally extending partition wall disposed diametrically across the hose bore to define liquid conducting conduits, the hose wall of at least one of said conduits having longitudinally rows of spaced apertures transversely therethrough to define perforations through which liquid flowing through said one conduit may escape as a spray, means for detachably coupling one end of said hose to the adjoining end of another similar hose, and manually operable valve means operatively connected to and interposed between said hose and a source of liquid supply whereby the liquid may be selectively introduced into at least one of said conduits, and threaded cap means at the free end of said hose remote from the source of liquid supply to selectively seal said hose at this end for preventing liquid from flowing out of said hose end.

References Cited in the file of this patent

UNITED STATES PATENTS

| | | |
|---|---|---|
| 1,180,807 | Vedder | Apr. 25, 1916 |
| 2,388,258 | Federighi | Nov. 6, 1945 |
| 2,566,833 | Healy | Sept. 4, 1951 |
| 2,624,341 | Wallace | Jan. 6, 1953 |